Patented Feb. 14, 1928.

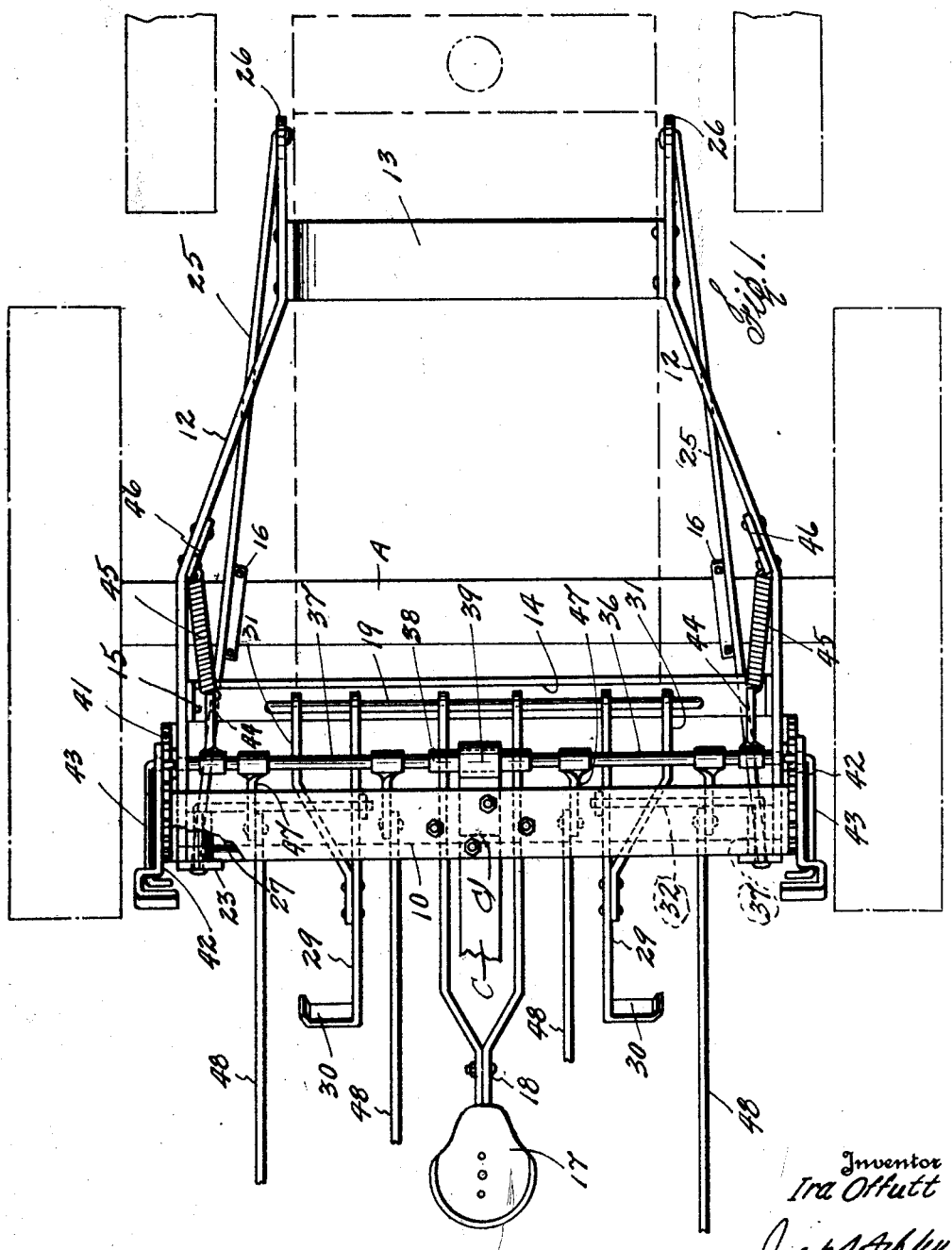

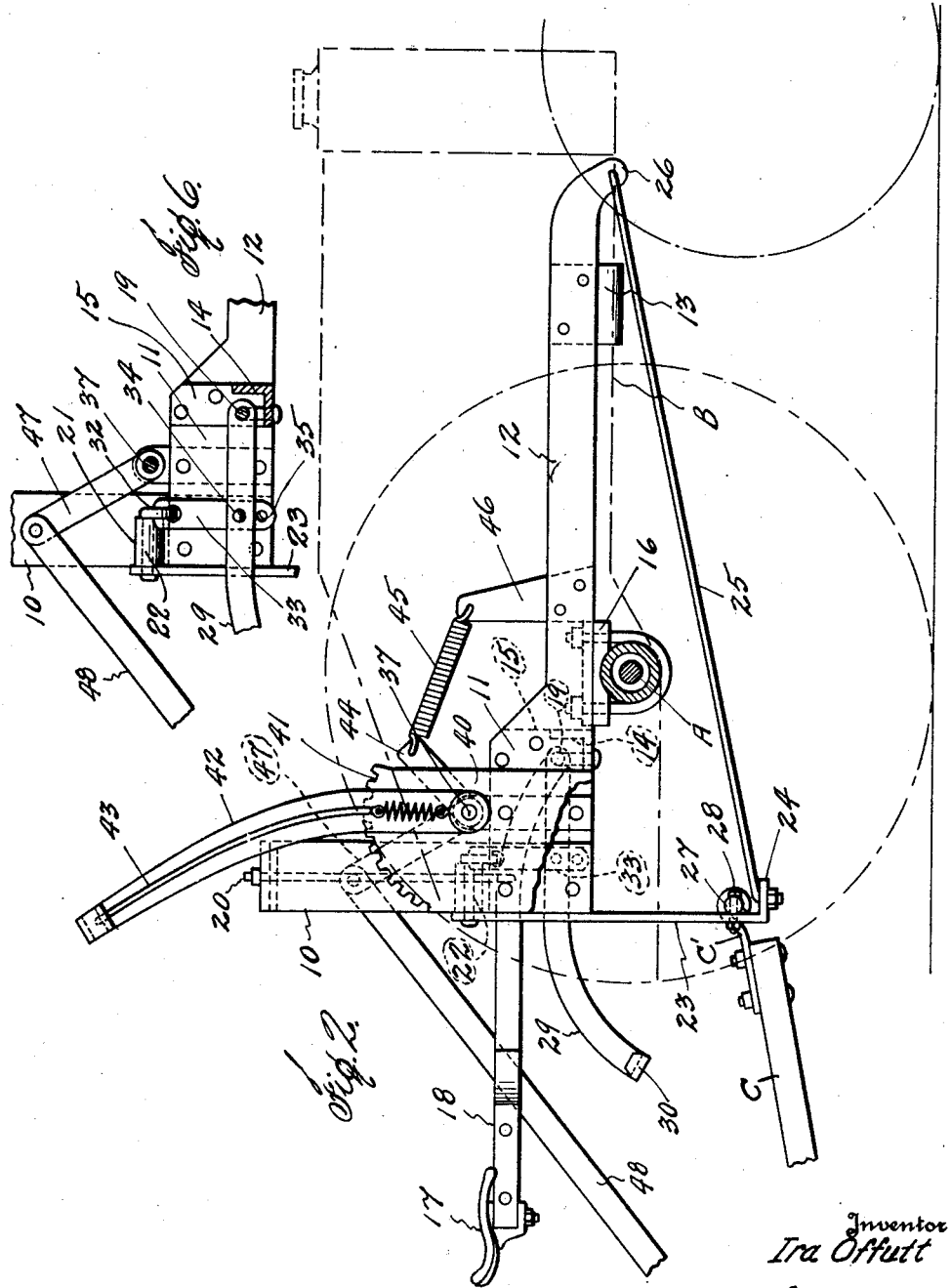

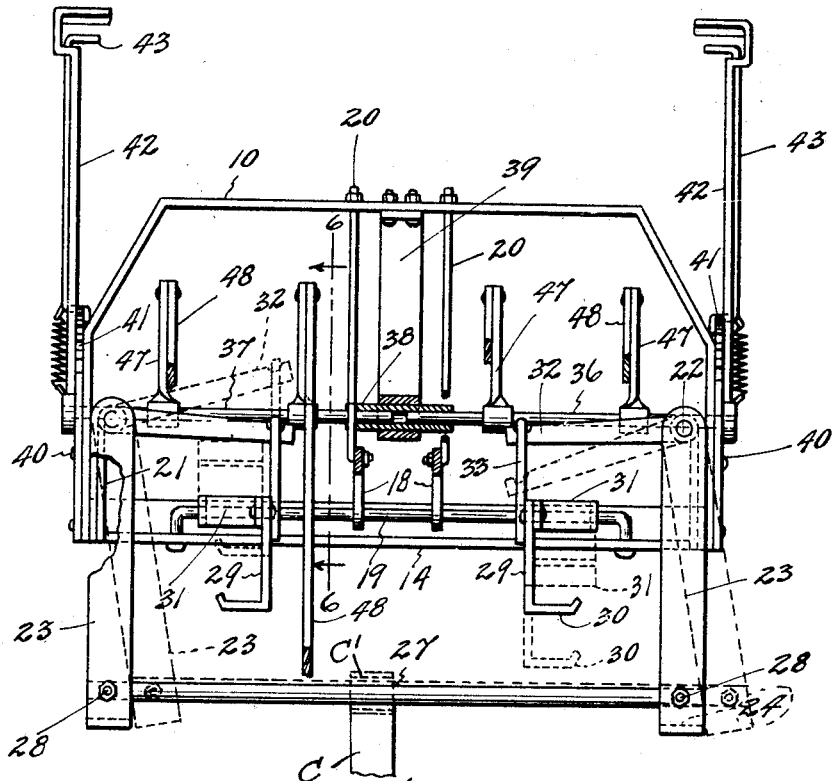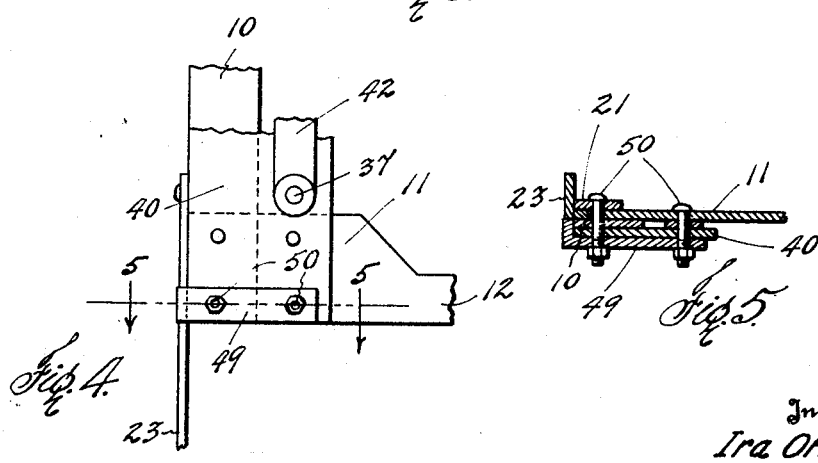

1,659,046

UNITED STATES PATENT OFFICE.

IRA OFFUTT, OF WHITNEY, TEXAS, ASSIGNOR OF ONE-FOURTH TO CHARLES THIZPEN AND ONE-FOURTH TO ALBERT RICHARD, BOTH OF WHITNEY, TEXAS.

COUPLING ATTACHMENT FOR TRACTORS.

Application filed January 10, 1927. Serial No. 160,134.

This invention relates to new and useful improvements in coupling attachments for tractors.

The object of the invention is to provide an attachment including a draw bar to which an agricultural implement is coupled and adapted to be connected to a tractor, whereby the implement is caused to function properly.

A particular object of the invention is to arrange the attachment so that the driver may manipulate it with his feet to guide the agricultural implement along the row, thus compensating for variances in the travel of the tractor.

Another object of the invention is to provide means on the attachment for elevating the working parts of the implement when it is not desired to use the same.

A still further object of the invention is to provide means for fastening the draw bar supports against swinging, whereby the latter may be made rigid.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a plan view of an attachment constructed in accordance with my invention, Fig. 2 is a side elevation of the same, a portion of the tractor being indicated in the dotted lines, Fig. 3 is a rear elevation of the attachment, Fig. 4 is a detail showing the hanger fastening means, Fig. 5 is a cross-sectional view taken on the line 5—5 of Fig. 4, and Fig. 6 is a vertical sectional view taken on the line 6—6 of Fig. 3.

In the drawings the numeral 10 designates a transverse arch or yoke. To the inner side of the yoke I rivet, or otherwise secure, the web plates 11 formed at the rear end of side bars 12. The side bars are connected near their forward ends by a transverse frame bar 13, which is curved downwardly. The web plates near their forward ends are fastened to a transverse angle bar 14 having upright brackets 15 at its ends, riveted or otherwise secured to said web plates. The parts 10, 11, 12, 13 and 14 constitute a supporting frame. The side bars 12 are provided with clamps 16 adapted to engage around the axle A of a tractor, while the bar 13 receives the oil pan B, said bars extending along each side of the tractor. This positions the attachment so that the arch 10 overhangs the rear portion of the tractor.

The usual tractor seat is removed and a seat 17 substituted therefor. The seat 17 is fastened on the rear contracted end of a seat bar 18 having its forward portions spread apart and pivoted on a keeper bar 19 secured to the angle bar 14. The seat bar is supported by rods 20 depending from the arch 10. Hanger brackets 21 are fastened to the inner sides of the web plates 11 at their rear ends and have crank arms 22 journalled therein. To the rear end of each crank arm is rigidly fastened a depending hanger bar 23, having a forwardly bent eye 24 on its lower end. Reach rods 25 have their rear ends bent downwardly and pivoted in said eyes, while their forward ends are hooked into ears 26 bent downwardly from the forward ends of the side bars 12. A draw bar 27 is pivoted to the hanger bars by studs 28 and the implement C is secured at the midlength of the draw bar by an iron C'. By this arrangement the hanger bars are caused to swing laterally or transversely of the attachment in unison and any pull sustained by the draw bar is partially transmitted to the rods 25 so that the strain is taken off of the hanger bars.

Foot bars 29, having stirrups 30 at their rear ends, are pivoted at their forward ends on the bar 19. These bars are reinforced by angular brace members 31 secured thereto and having their forward ends pivoted on the bar 19. The crank arms 22 are provided with hooks 32 engaged in the upper ends of links 33 having their lower ends pivoted to the foot bars 29. The foot bars are provided with pivot pins 34 and the lower ends of the links have apertures 35 receiving said pins, whereby the foot bars may be suspended at different elevations as is shown in Fig. 6. It will be seen that by pressing downward on either foot bar, the arm connected therewith will be rocked, whereby the hanger and draw bars will be swung. If it is desired to shift the bars to the right, the right hand stirrup 30 is depressed, and a shift to the left is accomplished by depressing the left hand stirrup.

In order to elevate and adjust implements connected to the draw bar 27, I provide dual adjusting means comprising rock shafts 36 and 37 respectively, having their inner ends journalled in a sleeve 38 carried by a bracket 39 depending from the arch 10. Each shaft has its outer end journalled in a plate 40 concentrically to a toothed segment 41 on the upper end of the plate. Each plate is fastened to the web plate 11 of one of the side bars. On the outer end of each shaft is fastened an adjusting lever 42 having a locking plunger 43 engaging the segment 41. On each shaft is fastened a short arm 44 to which is attached one end of a coil spring 45 having its forward end attached to a standard 46 extending upwardly from the adjacent side bar 12. A pair of upright lever arms 47 are screwed on each shaft and to the upper end of each arm 47 is pivoted a rearwardly extending link 48. Each pair of links may be suitably constructed at their rear ends for engaging with a cultivator, plow, planter, or some other implement. When one of the levers 42 is swung rearwardly, its links 48 are moved downwardly and rearwardly, thus lowering the implement attached thereto and the spring 45 is placed under tension. When said lever is swung forwardly to elevate the implement the spring 45 assists in the work, as will be obvious.

In case it is desired to fasten the hanger bars 23 and the draw bar 27 against swinging, I secured to the rear portion of the frame a pair of angular clips 49 by means of bolts 50, as is shown in Figs. 4 and 5. These clips bear against the outer edges of the bars 23 well below the pivots of the latter and thus hold the same against swinging. It will be seen that the attachment may be readily applied to a tractor and easily installed without extensive fastenings or the removal of parts.

The driver has absolute control of the trailing implement and may guide and adjust the same at will.

Various changes in the size and shape of the different parts, as well as modifications and alterations, may be made within the scope of the appended claims.

What I claim, is:

1. A tractor coupling attachment comprising a supporting frame adapted to be attached to a tractor, a draw bar suspended from the attachment by means of hangers, for transverse adjustment, crank members carried by said hangers, and foot devices connected to said members for operating the draw bar adjustment.

2. A tractor coupling attachment comprising a supporting frame adapted to be attached to a tractor, a draw bar, pivoted hangers for suspending the draw bar, crank arms carried by the pivots of said hangers, and foot operated devices connected with the crank arms for swinging the same transversely of the attachment.

3. A tractor coupling attachment comprising a supporting frame adapted to be attached to a tractor, a draw bar, means for suspending the draw bar, foot operated devices connected with the draw bar suspending means for swinging the same transversely of the attachment, and means for fastening the draw bar suspending means against swinging.

4. A tractor coupling attachment comprising a frame, crank arms journalled in the frame, hanger bars attached to the crank arms, a draw bar connected with the hanger bars, and pivoted foot bars extended beneath the crank arms and having a vertical connection therewith.

5. A tractor coupling attachment comprising a frame, crank arms journalled in the frame, hanger bars attached to the pivot of the crank arms, a draw bar connected with the hanger bars, pivoted foot bars connected to the crank arms by means of interposed links, and sustaining bars extending from the hanger bars to the frame.

6. A tractor coupling attachment comprising a frame having a yoke, crank arms journalled in the frame yoke, hanger bars attached to the crank arms, a draw bar connected with the hanger bars, pivoted foot bars pivoted beneath said arms and having vertical connections to the crank arms, a shaft journalled in the frame yoke and having a lever arm, a connection extending from the lever arm for engaging an implement and an adjusting lever connected with said shaft.

7. A tractor coupling attachment comprising a frame including a pair of side bars connected by a transverse bar at their forward ends and an arch at their rear ends, a transverse bar mounted across the rear portion of the frame, a keeper bar connected to the transverse bar, crank arms, brackets for supporting the crank arms attached to the side bars of the frame, hanger bars fastened at their upper ends to the crank arms, a draw bar pivoted to the lower ends of the hanger bars, foot bars pivoted at their forward ends on the keeper bar and having stirrups at their rear ends, links connecting the foot bars with the crank arms and a seat suspended from the arch.

8. A tractor coupling attachment comprising a supporting frame adapted to be attached to a tractor, a draw bar, means for suspending the draw bar, foot operated devices connected with said suspending means for swinging the same transversely of the attachment, and a detachable holding member carried by the frame in the path of travel of the suspending means.

In testimony whereof I affix my signature.

IRA OFFUTT.

CERTIFICATE OF CORRECTION.

Patent No. 1,659,046.  Granted February 14, 1928, to

IRA OFFUTT.

It is hereby certified that the name of the assignee in the above numbered patent was erroneously written and printed as "Charles Thizpen", whereas said name should have been written and printed as "Charles Thigpen", as shown by the records of assignments in this office; and that the said Letters Patent should be read with this correction therein that the same may conform to the record of the case in the Patent Office.

Signed and sealed this 13th day of March, A. D. 1928.

Seal.

M. J. Moore,
Acting Commissioner of Patents.